(12) United States Patent
Wootton et al.

(10) Patent No.: US 6,535,637 B1
(45) Date of Patent: *Mar. 18, 2003

(54) PHARMACEUTICAL PILL RECOGNITION AND VERIFICATION SYSTEM

(75) Inventors: John R. Wootton, St. Louis, MO (US); Victor V. Reznack, Edwardsville, IL (US); Greg Hobson, St. Charles, MO (US)

(73) Assignee: Esco Electronics, Inc., St.Louis, MO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,296

(22) Filed: Jul. 30, 1998

(30) Foreign Application Priority Data

Apr. 4, 1997 (GB) .............................................. 9706942

(51) Int. Cl.[7] ................................................. G06K 9/46
(52) U.S. Cl. ...................... 382/190; 382/165; 382/190; 53/55; 221/2; 221/8; 221/93; 221/102
(58) Field of Search ................................. 382/165, 173, 382/190, 191; 221/2, 7, 82, 89, 97, 102, 113, 130

(56) References Cited

U.S. PATENT DOCUMENTS 4,183,013 A * 1/1980 Agrawala et al. ........... 382/173
4,991,223 A * 2/1991 Bradley ...................... 382/165
5,441,165 A    8/1995 Kemp et al.
5,502,944 A * 4/1996 Kraft et al. ..................... 53/55
5,712,658 A * 1/1998 Arita et al. .................. 345/158
5,915,560 A * 6/1999 George et al. .............. 206/537

* cited by examiner

*Primary Examiner*—Jose L. Couso
*Assistant Examiner*—Gregory Desire
(74) *Attorney, Agent, or Firm*—Polster, Lieder, Woodruff & Lucchesi, L.C.

(57) ABSTRACT

A method of dispensing a prescribed medication, in pill form, and verifying that the medication dispensed is the prescribed medication. A medication identified from a prescription (P) is dispensed into a container (C). An image of the dispensed pills is taken and processed to obtain a set of characteristic features of the pill. These features include the coloration, shape, size, and any surface features of the pills. These features are then automatically compared with those of all the pills which can be dispensed by a dispensing apparatus (10). If a pill can be uniquely identified as the correct pill, the container of pills is accepted. Otherwise, the container is rejected. If, as a result of the processing, a determination cannot be made, the container is provisionally rejected and is subsequently inspected by a pharmacist to determine if the prescription is correctly filled.

28 Claims, 9 Drawing Sheets

(3 of 9 Drawing Sheet(s) Filed in Color)

PHARMACEUTICAL PILL RECOGNITION AND VERIFICATION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to an automated process for filling pharmaceutical prescriptions for medications which may be taken in the form of pills, capsules, caplets, etc., and more particularly, to system and method for visually verifying that the medication with which a container is filled is the correct medication for the prescription being filled.

Within the medical establishment, certain facilities (Veteran's hospitals, large general hospitals, mail order drug firms, large central drug stores) are required to fill a large number of prescriptions on a routine basis, e.g., daily. To accomplish what is an otherwise manually intensive task, these establishments employ machines. capable of filling these large numbers of prescriptions in a timely manner. The machines not only dispense the requisite number and type of medication into a container, but also attach a label to the container describing both the contents of the container and prescription involved.

Referring to FIGS. 1 and 2, a pill dispensing machine 10 and a schematic of its operation are shown. The particular machine shown in FIG. 1 is manufactured by the assignee of the present application, and sold under the tradename Optifill II™. A machine 10 of the type shown in FIG. 1 includes hundreds of hoppers H located in a dispenser 12 portion of the machine, each hopper being prefilled with a different medication M. These medications are pills which come in a variety of shapes, sizes, and colors. Operation of the machine starts with the generation of a bar coded, patient specific, label L, the information included on the label being taken from a prescription form P such as is issued by a doctor, and this information is read by a reader 14 of the machine. The label is applied to a container C such as a conventional pill bottle, and the information on the label is also supplied to a machine controller 16. Container C is routed along the machine passing a series of filling stations within the dispenser portion of the machine. At the appropriate dispensing station, the hopper H containing the appropriate medication is opened, and the number of pills specified by the prescription are dispensed into the bottle. Once the bottle is filled, a color camera 18 which is located above the path of the bottle captures a near, overhead image of the contents of the bottle. The bottle is then closed with a cap A by a capper 20, and label L is applied to the outside of the bottle by a labeler 22.

As indicated in FIG. 2, and image Ib of the contents of the bottle, as captured by camera 18, is displayed on a video monitor 24, alongside a stored reference image Ir. Image Ir represents one pill, or a prior sample of the type of pills for the medication indicated in prescription P and with which the container should be filled. Monitor 24 is viewed by a pharmacist E. The role of the pharmacist is to verify the contents of the container as indicated by the prescription information printed on label L. If the pharmacist confirms that the bottle is filled with the correct medication, the capped and labeled bottle is made available for delivery to the patient. If the pharmacist rejects the contents of the container, the bottle is automatically removed from the stream of bottles, the prescription information is re-entered into machine 10, and the filling process is repeated.

Other drug or medication dispensing systems are known in the art. For example, U.S. Pat. No. 5,720,154 describes such a system utilizing upper and lower hoppers containing prescription pills which are released by computer control into a container. A somewhat simpler system is described in U.S. Pat. No. 4,573,606. Other systems are described in commonly assigned U.S. Pat. Nos. 5,562,232 and 5,490,610. Control logic for the automated dispensing of pills is described, for example, in U.S. Pat. No. 5,337,919. Other pill dispensing art relates to the timely dispensing of pills to a single patient. See, for example, U.S. Pat. No. 4,640,560.

None of the above referenced patents address the issue of whether or not the correct pill has been dispensed into the correct patient container, and none addresses the use of image processing to automatically perform that task.

BRIEF SUMMARY OF THE INVENTION

Among the several objects of the present invention may be noted the provision of a method and apparatus for filling a pharmaceutical prescription for a medication. In particular, the method and apparatus automatically verify the type of medication dispensed as part of a filling operation performed by the apparatus. The method of the invention performs this verification using an image processing technique.

Another object of the invention is a method and apparatus in which an image of the medication as dispensed into a container is obtained and thereafter image processed to classify attributes of the dispensed medication and to quickly and accurately identify the medication on the basis of the classification. The image of the medication is then compared with the medication requested to be dispensed to fill the prescription and if the identity corresponds with that requested the filled prescription is dispensed to the patient. If, however, the identity does not correspond, or if execution of the method cannot identify the medication, to that requested, the container is set aside for further analysis.

The method of the invention utilizes medication features including the color of pills, their geometry, and surface features to identify the medication used to fill each prescription, and to do so with a high degree of accuracy. This enables the apparatus to quickly and efficiently fill a large number of prescriptions. Because of the accuracy achievable using the image processing techniques of the present invention, an outside agency such as a pharmacist is now needed only to check those filled prescriptions which are rejected or of which the apparatus is unsure, rather than all the prescriptions which are filled. The apparatus is "tireless" and avoids errors which might result from human fatigue. It also is no longer "bottlenecked" by the review speed of the pharmacist who previously had to check all prescriptions.

A further object of the invention is an apparatus employing an expandable database containing information about all of the medications dispensed to fill prescriptions, including attributes of each medication. Among the types of attribute information stored in the database are the shape of a pill (e.g., capsule, caplet, cardioid form), the size of the pills, the color or colors of each, and surface features such as indicia on the medication by which the medication is identified by a manufacturer. The image processing method of the invention performs extraction of these various features.

Finally, it is an object of the present invention to substantially reduce the cost of filling a prescription while simultaneously insuring the accuracy of each medication dispensed.

In accordance with the invention, generally stated, apparatus is provided for dispensing a prescribed medication and automatically verifying that the dispensed medication is the prescribed medication. A reader reads a prescription and identifies therefrom which one of a plurality of medications are to be dispensed into a container to fill the prescription. A dispenser dispenses units of the medication from a supply thereof into the container. A camera obtains an image of the units of medication as they reside in the container. An image processor then processes the image to extract features of the medication including the color or colors of the pills, their shape and size, and any surface features (including any markings) they may have. The extracted features are then compared to a database of medication features to identify the dispensed medication based upon the extracted features. A comparison of the extracted and stored features either verifies that the medication in the container is that to be dispensed in accordance with the prescription, or that it is not the medication, or that the system cannot determine if the medication is correct according to the prescription. If there is verification, the container is released for the patient. If there is no verification, the container is set aside and not released to the patient. Other objects and features will be in part apparent and in part pointed out hereinafter.

BRIEF DESCRIPTION OF THE SEVERAL VIEWS OF THE DRAWINGS

This application contains at least one drawing executed in color.

In the drawings.

Corresponding reference characters indicate corresponding parts throughout the drawings.

DETAILED DESCRIPTION OF THE INVENTION

Figure 1:
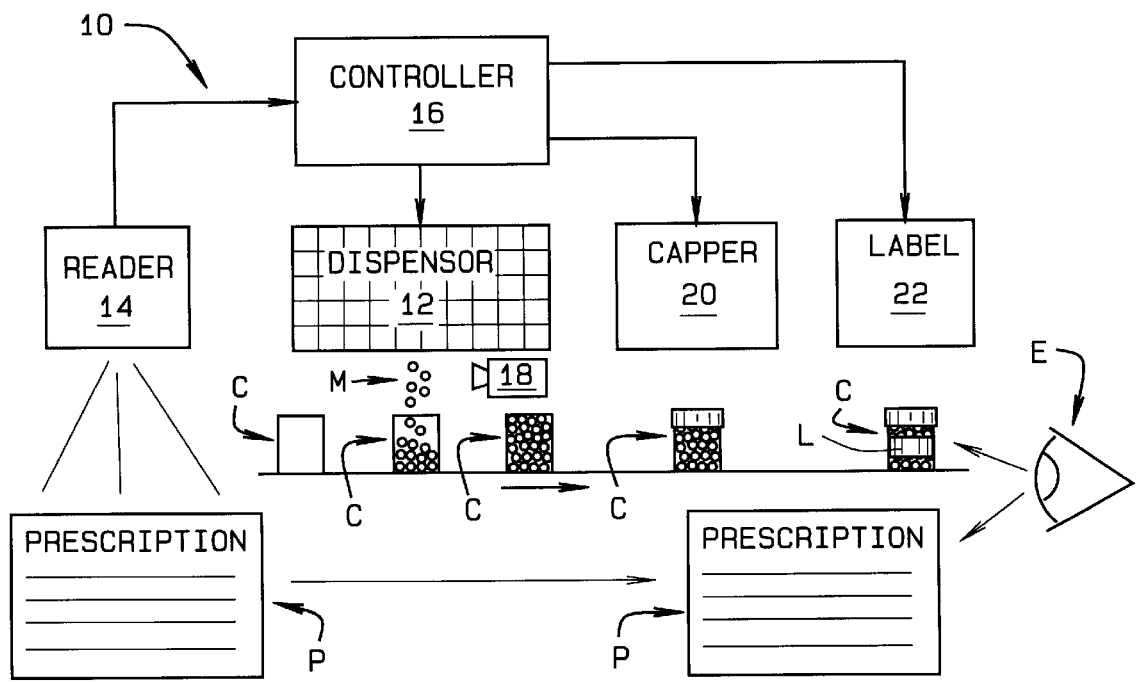
FIG. 1 is a simplified block diagram illustrating an automated prescription filling device of the prior art.
Figure 2:
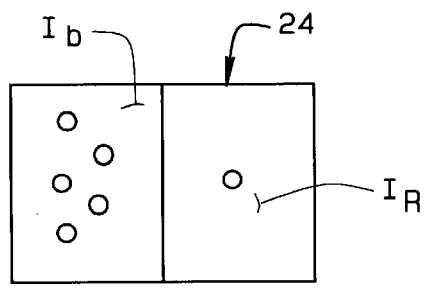
FIG. 2 represents an image presentation of a filled prescription as checked by a pharmacist for correctness.

Referring to the drawings, the apparatus and method of the present invention automatically performs a verification function without the need of a human observer, unlike the prior art system shown and described with respect to FIGS. 1 and 2. Rather, the apparatus employs visual imaging and processing techniques by which the contents of each container are observed, characteristics of the medication with which the container is filled are obtained, and resulting characteristics or attributes are identified and compared against the expected attributes of a reference of the prescribed medication stored in a database. If the identified characteristics or attributes match the database information for the medication set out in a prescription, and these characteristics uniquely differentiate one type of medication from any other potential medication, then the container is accepted. Only if the contents of a container cannot be identified, or if the contents cannot be identified with a predetermined degree of certainty, is the container visually inspected by the pharmacist. The speed with which the apparatus performs its verification function is compatible with that at which system 10 operates, so verification does not create a bottleneck in the system. Further, because the apparatus can successfully perform its functions with a high degree of accuracy, the few containers which are rejected can be easily inspected off-line by the pharmacist.

Figure 11:
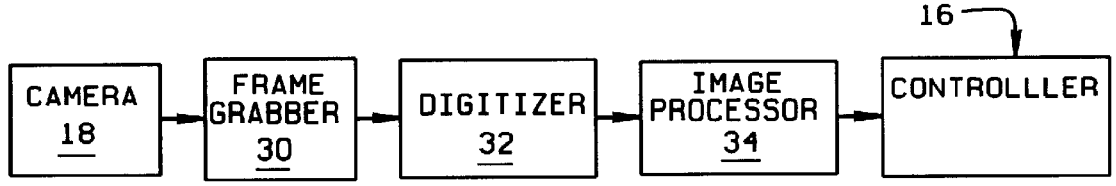
FIG. 11 is a block diagram of the image processing and display of the present invention.

Referring to FIG. 11, in accordance with the invention, the color image taken from the camera 18 in FIG. 1 is passed to a frame grabber 30, digitized as indicated at 32, and passed to a general purpose computer 34 programmed to perform the requisite image processing. The image processing performed is that required to recognize the contents of a pill container C and verify that the container contains pills exhibiting the same features as the reference pill for that prescription, and that those features are sufficiently different from any other pill type currently being dispensed within the given machine. Three results derive from the image processor's assessment of the contents of pill container C. viz. a) confirmation of the contents, b) rejection of the contents, or c) admission of potential confusion between the content being the pill of choice, or another pill dispensed from another hopper of the machine. Results of the verification process are passed to controller 16 of FIG. 1 with container C being routed to one of three areas, viz. i) an output area for those containers whose contents are confirmed, ii) a staging area for rejected containers, and iii) a staging area for containers requiring human inspection to verify the contents of a container.

What is known a priori for image processing is:
 a) a set of measured features for all pills required to be recognized for a given machine;
 b) the separability of these features of a given pill from those features of all other pills, especially those pills exhibiting the closest feature sets;
 c) the particular pill type for a given prescription; and
 d) the number of pills in a given prescription.

The crux of the invention is the ability to uniquely identify, from the image being processed, characteristics (features) of the pills contained within container C as matching only those of a "reference" pill that is of the type described on the label. The generic features of pills which are exploited by the image processing method of the invention are:

1) color;
2) geometry;
3) surface features.

Figure 15:
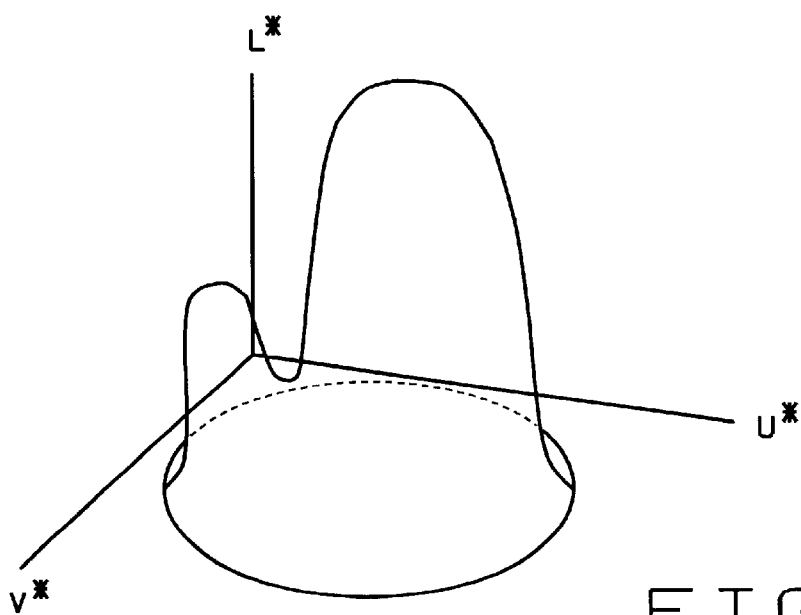
FIG. 15 represents a three-dimensional plot of the color of different pill types.
Figure 12:
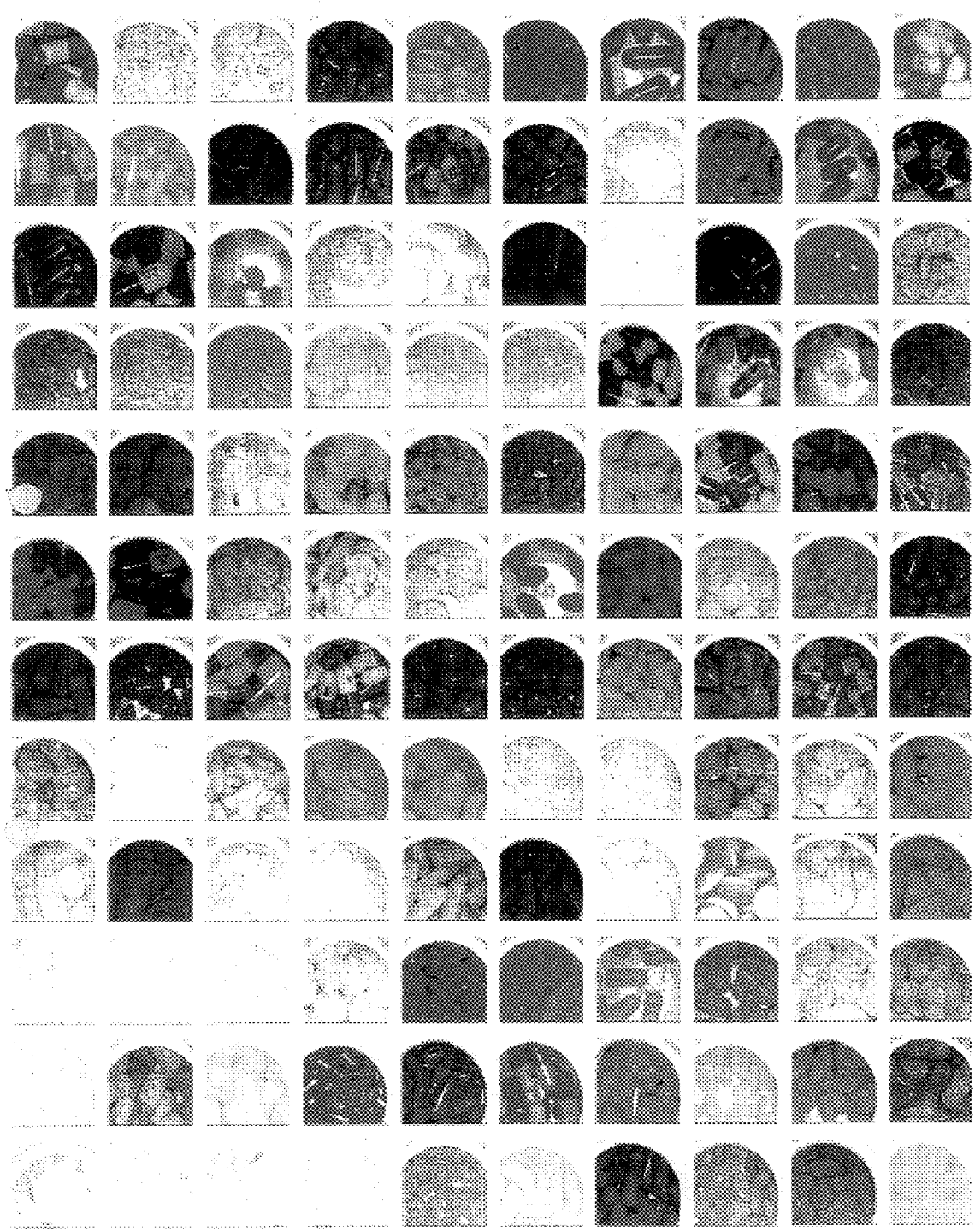
FIGS. 12–14 are color images of dispensed pills and based on which the image processing distinguishes one pill from another.
Figure 13:
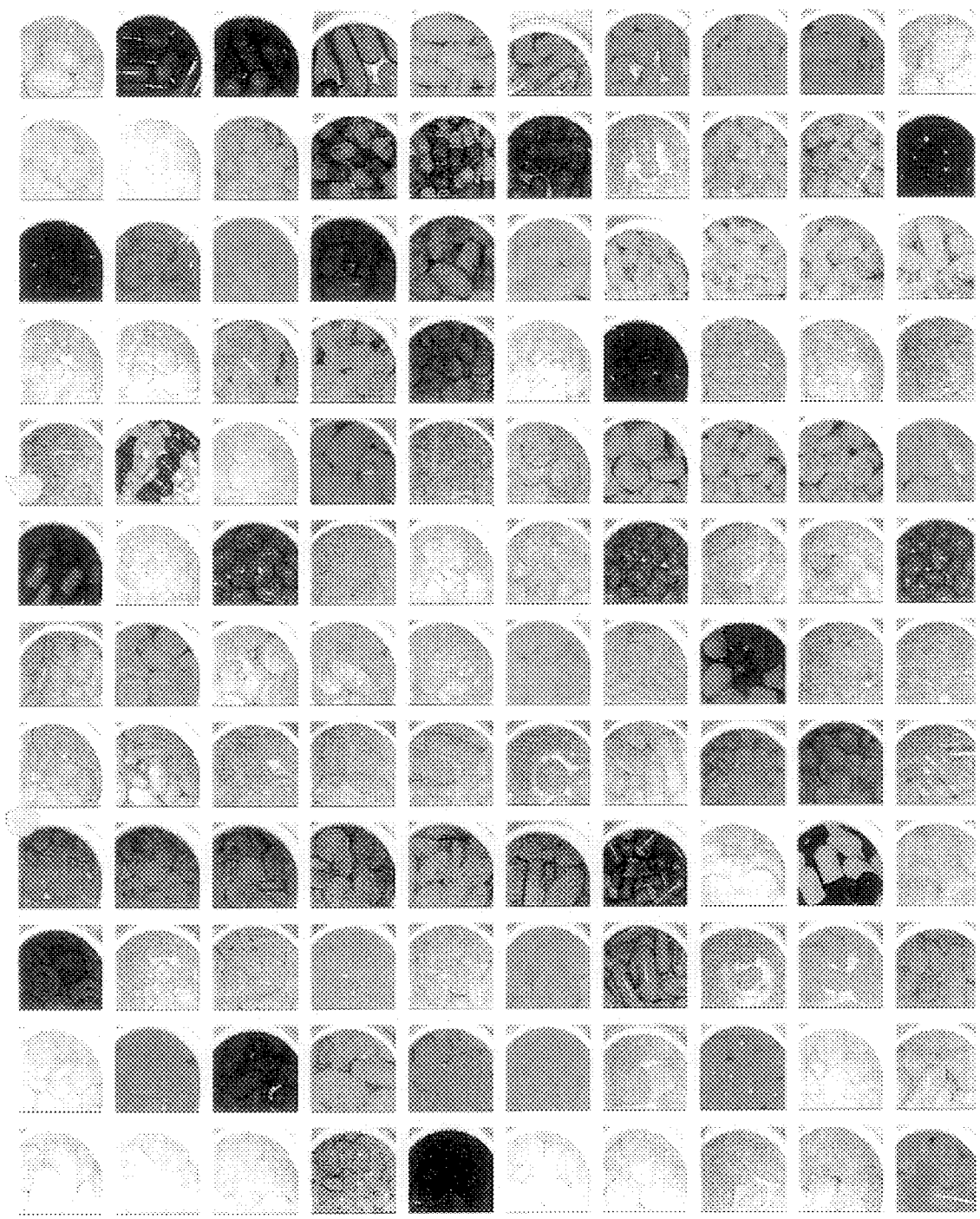
Figure 14:
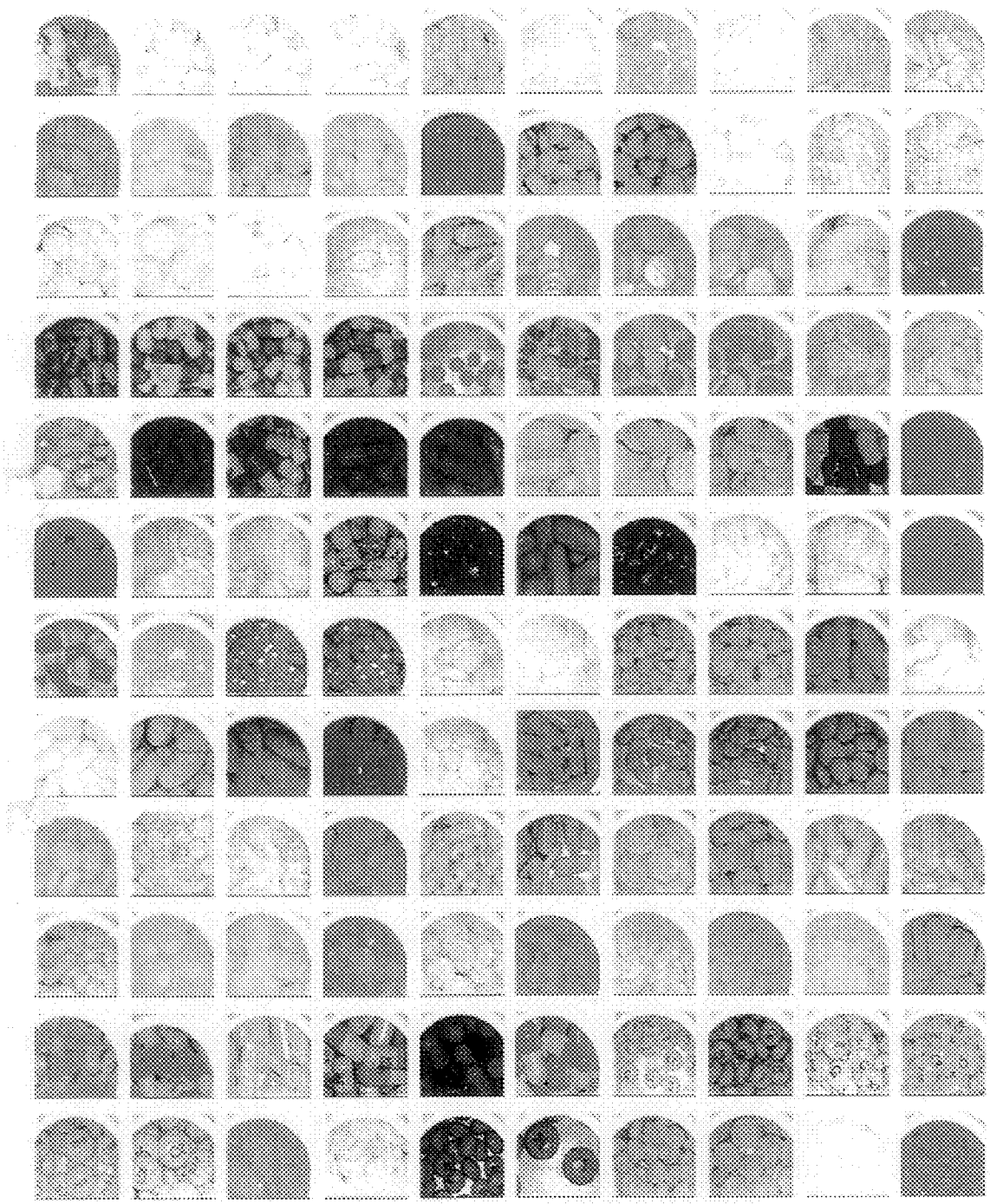

With respect to color, as can be seen in FIGS. 12–14, color is a readily distinguishable feature because many pills have a simple homogenous color. Other pills have two shades of the same color, or have two distinctly different shades. In a few instances, pills have three associated colors. The markings are often of a different color affording a degree of color contrast on the markings. However, there are instances where markings are simply embossed on the pill surface. Unfortunately, whereas color is a good discriminant for some of the pills, a significant number of pills are white, and thus additional characteristics are required. Nevertheless, color is probably the easiest feature to extract. A large area of a digitized image frame can be sampled, and the color for each pixel within the area expressed in a convenient three-dimensional color space as shown in FIG. 15. The pixels are then clustered in this color and brightness space by standard clustering techniques. Since the color of container C is known; white, for example, any other cluster centers represent the color or colors of the pills filling the container. The color cluster (or clusters) from the sample can now be compared to a target representing known color clusters. Even if color only serves to pare down the list of pill candidates which could possibly be the sample, it comprises a useful first test.

Figure 16:
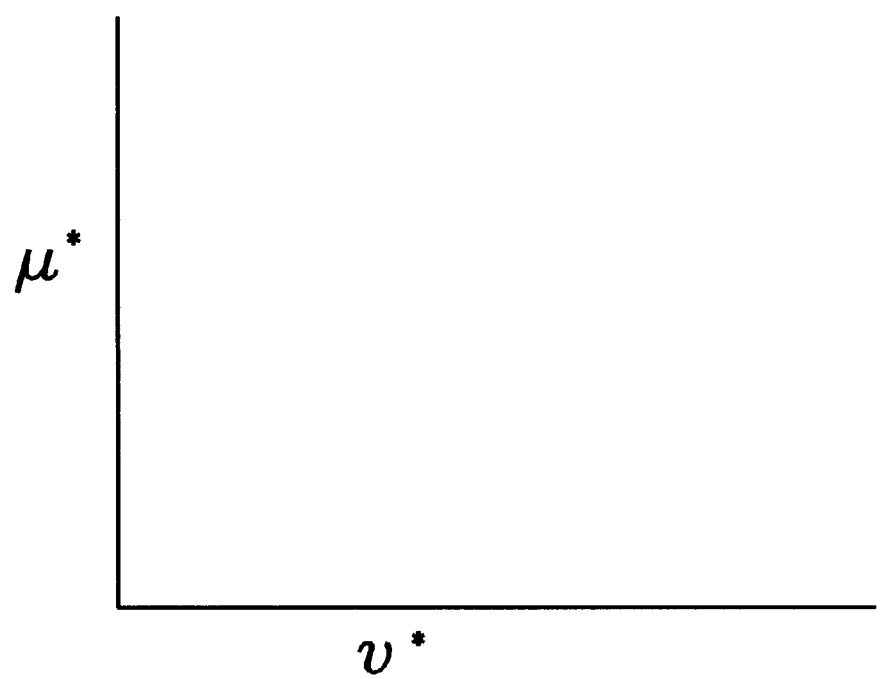
FIG. 16 represents a chromaticity diagram.

There is a large choice of possible color spaces in which to work. The best is one in which the pills of the reference data set; that is, all the pills currently dispensed by apparatus 10, show the greatest separability. Unfortunately, there is no way to know this optimum space without trying all possible spaces. Accordingly, the CIELUV industry standard system has been selected for use in carrying out the method of the invention. This is a "uniform" color space in that Euclidean distances in this space correspond roughly to color differences as perceived by humans, and it is a widely known and used system[1]; for example, colors that appear farther apart to humans are farther apart in this space. The three coordinates in this space (which can be calculated from red (R), green (G), and blue (B) color signal of the camera) are labeled L*, u*, and v*. The first coordinate L is an approximate measure of the subjective impression of lightness, and is referred to as "CIE 1976 psychometric lightness". The other two coordinates, u* and v*, make up the chromaticity of the color and can be shown in a two-dimensional, chromaticity diagram, see FIG. 16. In such a two-dimensional diagram (the u*, v* plane), saturation is directly proportional to the magnitude of the u*, v* vector, while hue is given by the polar angle of the vector. White (more properly achromatic colors, meaning the gray scale) is located at u*=0, v*=0. As for the hues, reds to yellow are in a first quadrant (u*+, v*+), yellow-green to bluish green are in a second quadrant (u*−, v*+), blues are in a third quadrant (u*−, v*−), and purples to red are in the fourth quadrant (u*+, v*−).

[1]W.N. Sproson—Colour Science in Television and Display Systems—(Adam Higher Ltd., Bristol, 1983), p. 19

As a first pass, a large number of pixels across a sample frame are taken. If the target pill is a single color, then a clustering algorithm to give the best two clusters in the color space is chosen; one cluster being the container color, and the other the sample pill color. If the target pill is two colors, then the best three clusters are chosen; one being the container color, and the other two the sample pill colors. Mean coordinates for each cluster in the sample, and its standard deviations; are known; together with. the same data for a similar sampling of every frame in the reference data set. That is, sample coordinates $L^*_s, u^*_s, v^*_s$ are determined together with standard deviations $\sigma_{Ls}, \sigma_{us}$, and $\sigma_{vs}$. Corresponding quantities for a pill in the reference data set are $L^*_i, u^*_i, V^*_i$ with standard deviations $\sigma_{Li}, \sigma_{ui}$, and $\sigma_{vi}$. It can be said that there is a color match between the sample and pill i if $L^*_s \pm k\sigma_{Ls}$ overlaps $L^*_i \pm k\sigma_{Li}$, and $u^*_s \pm k\sigma_{us}$ overlaps $u^*_i \pm k\sigma_{ui}$, and $v^*_s \pm k\sigma_{vs}$ overlaps $v^*_i \pm k\sigma_{vi}$, where k is a chosen constant. This approximate procedure uses a rectangular parallelepiped around the mean cluster point as an acceptance region in the color space.

Much of the standard deviation in color coordinates arises from large area sampling which takes points on different facets of different pills because the pills are jumbled in the container C in which they are deposited. These different facets, or similar facets but at different positions, all have different lighting. Standard deviations would be much less if we could confine our attention to pixels from a single facet. For this reason, the method of the invention includes a second color sampling, after shape operations have allowed the selection of a single facet of a single pill within the container. Another match is then made, as described above, with resulting reduced acceptance regions. This further narrows the field of candidates.

The next step in establishing the unique features of a pill set is to evaluating the geometry of a pill. Pill geometry consists of two generic characteristics; i.e., shape and size. From the image of the reference set of pills, pill shape can be characterized into 3 broad categories and 16 subcategories, while further retaining a few unique categories for some uniquely shaped pills. Before discussing shape categories, it will be understood that the shape descriptives given below are described in terms a human can understand as a category. Image processor 34 performs a (color) segmentation which allows the extraction and isolation of the outline of individual pills from the pile of pills within the container. First, a binary edge map of individual pills is extracted for the pills in container C. As these pills are at any aspect, we look to find one pill which most closely correlates to the expected (reference) pill shape. Next, we extract features that are orientation independent such as the ratio of major pill axis to its minor, the length of the perimeter of the pill, and the principal Fourier coefficients.

Figure 3A:
FIGS. 3A–3C represent round pill shapes with FIG. 3A represents a spherical pill shape, FIG. 3B a cylindrical pill shape, and FIG. 3C an ellipsoidal shape.
Figure 3B:
Figure 3C:
Figure 4A:
FIGS. 4A–4H represent elongated pill shapes with FIG. 4A an elongated capsule shape, FIG. 4B an oval, cylindrical shape, FIG. 4C a "racetrack" cylindrical shape, FIG. 4D an elongated ellipsoid shape, FIG. 4E an elongated rectangular shape, FIG. 4F a super elliptical cylindrical shape, FIG. 4G a hexagonal cylindrical shape, and FIG. 4H an octagonal cylindrical shape.
Figure 4B:
Figure 4C:
Figure 4D:
Figure 4E:
Figure 4F:
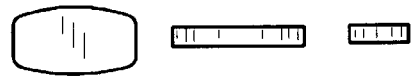
Figure 4G:
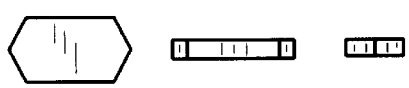
Figure 4H:
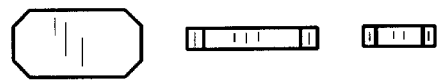
Figure 5:
FIG. 5 represents triangular, cylindrical pill shape.
Figure 6:
FIG. 6 represents a cardioid cylindrical pill shape.
Figure 7:
FIG. 7 represents a hexagonal cylindrical pill shape.
Figure 8:
FIG. 8 represents a "homeplate" pill shape.
Figure 9:
FIG. 9 represents a "shield" pill shape.

Referring again to the drawings, FIGS. 3A–3C, 4A–4H, and 5–9 illustrate the three broad categories and 16 subcategories useful for recognition. The categories and subcategories are as follows:

| BROAD CATEGORY | SUBCATEGORIES |
| --- | --- |
| Round | Spherical - FIG. 3A |
| | Circular Cylinder (disc) - FIG. 3B |
| | Ellipsoid - FIG. 3C |
| Elongated | Capsule - FIG. 4A |
| | Oval Cylinder - FIG. 4B |
| | "Racetrack" Cylinder - FIG. 4C |
| | Ellipsoid - FIG. 4D |
| | Rectangular Cylinder - FIG. 4E |
| | Super Elliptical Cylinder - FIG. 4F |
| | Hexagonal Cylinder - FIG. 4G |
| | Octagonal Cylinder - FIG. 4H |
| Miscellaneous | Triangular Cylinder - FIG. 5 |
| | Cardioid Cylinder - FIG. 6 |
| | Hexagonal Cylinder FIG. 7 |
| | "Homeplate" Cylinder FIG. 8 |
| | "Shield" Cylinder - FIG. 9 |

Figure 17:
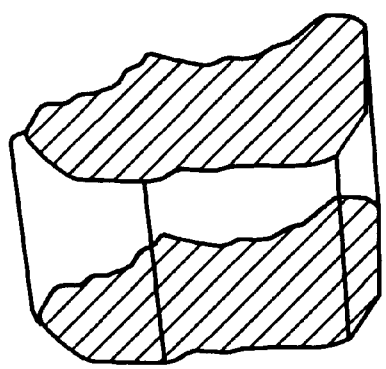
FIG. 17 illustrates an irregular cylinder shape.

Although the same subcategory name may appear in more than one broad category, the pills they define are of distinguishably different shapes. That is, a round ellipsoid pill shape is distinguishable from an elongated ellipsoid pill shape, and an elongated hexagonal cylinder pill shape is distinguishable from the hexagonal cylinder pill shape listed under Miscellaneous. By the descriptor cylinder we infer a two-dimensional area translated perpendicular to that area to form a three-dimensional figure. This formation by translation implies there is some aspect from which straight line edges are visible. This is not true for ellipsoids and spheres. This point is illustrated with respect to FIG. 17.

The respective pill shapes are explained in detail below and with reference to the respective drawing FIGS. In the drawings, each separate FIG. includes one view showing the two largest dimensions perpendicular to a line of sight and which is designated as the top view. The other views in the drawing FIG. include one or more side views which are perpendicular to the first. Each shape discrimination is described below.

1. Round, Spherical (FIG. 3A).

This shape is self-explanatory. An edge map delineating the edges of this pill will show only circular arcs.

2. Round, Circular Cylinder (FIG. 3B)

This pill shape appear to be the most prevalent. Variations include domed end pills, flat top and flat bottom pills. The pills exhibiting this shape further have different ratios of diameter and thickness, and rounded or sharp edges.

3. Round, Ellipsoid (FIG. 3C)

This is close to (or exactly) an ellipsoid of revolution, with the minor axis as the axis of revolution. Pills of this type are difficult to distinguish from circular, cylindrically shaped pills of the type shown in FIG. 3B, if these latter pills are domed and have rounded edges. In any event, pills having this ellipsoidal shape never display any straight edges.

4. Elongated Capsule (FIG. 4A)

This shape comprises a right circular cylinder with a hemispherical cap at each end. It appears to be the second most prevalent pill shape. Variations in pill shape are a function of the length to diameter ratio.

5. Elongated Oval Cylinder (FIG. 4B)

Pills of this type can closely resemble those having an elliptical cylinder shape; and in some instances, are one and the same. However, pills in this category also include those having non-elliptical, oval shapes which are clearly more pointed at the ends than elliptical. The ends can be flat or domed. The succeeding comments with respect to super elliptical cylinder pill shapes are also applicable.

6. Elongated, Racetrack Cylinder (FIG. 4C)

This pill shape exhibits two parallel, straight edges (as shown in the top view of the FIG.), with semicircular ends. The ends can be flat or domed, and there are variations in the pill shape as a function of the ratios of the three dimensions.

7. Elongated Ellipsoid (FIG. 4D)

This pill shape is an ellipsoid of revolution with the axis of revolution being the major axis of the ellipse. This shape is difficult to distinguish from other capsule shapes if the ellipse is very eccentric; however, this shape shows no straight edges from any viewpoint. The distinction between this shape and the round ellipsoid pill shape is that, for this pill shape, the circular aspect has a diameter smaller than the major axis of the elliptical aspect; while for the round shape, the circular diameter is the same size as the elliptical major axis.

8. Elongated, Rectangular Cylinder (FIG. 4E)

Although pills having this shape have rounded corners, they are distinguishable by four straight edges in the top view.

9. Elongated, Super Elliptical Cylinder (FIG. 4F)

This pill shape is similar to both the oval cylinder (FIG. 4B) and rectangular cylinder (FIG. 4E) pill shapes. They are similar to the former in that they show no perfectly straight edges in the top view, and to the latter in that they show four rounded corners.

10. Elongated, Hexagonal Cylinder (FIG. 4G)

Pills of this type are hexagonally shaped and have one elongated dimension in the top view.

11. Elongated, Octagonal Cylinder (FIG. 4H)

Pills of this type are octagonally shaped with one elongated dimension in the top view. They appear similar to pills having rectangular cylindrical shape (FIG. 4E) but exhibit beveled corners instead of rounded corners.

12. Miscellaneous, Triangular Cylinder (FIG. 5)

Most pills having this shape have rounded corners, but some have straight, beveled corners.

13. Miscellaneous, Cardioid Cylinder (FIG. 6)

This shape is self explanatory.

14. Miscellaneous, Hexagonal Cylinder (FIG. 7)

Pills of this type appear as a regular hexagon in the top view. All the edges of the pill shape appear as straight edges in any view.

15. Miscellaneous, "Homeplate" Cylinder (FIG. 8)

These pills appear to be shaped like the homeplate of a baseball diamond in their top view. All the edges of the pill shape appear as straight edges in any view.

16. Miscellaneous "Shield" Cylinder (FIG. 9)

Pills of this type appear as a "shield" or "badge" in their top view.

The second aspect of geometry is size. There are several difficulties in estimating size when using a camera. First, the apparent size of a pill, as viewed from a camera, depends upon camera parameters such as focal length, camera format, camera mounting height (e.g. entrance pupil to the bottom of the pill container), and pill container contents (number of pills in the container, dimensions of the container, size of the pills, and the aspect of the pills). However, with a knowledge of the camera, geometry, the expected number of pills in a container, and the aspect angle of the pills, at least an estimate of the size of the pills can be established.

In many instances, color and geometry alone are not sufficient to recognize a pill as the target pill. Therefore, another broad set of characteristics are established, these characteristics relating to surface features. Surface features includes surface finish (glossy or matte), texture, scores (for breaking the pill into parts), and markings (alphanumerics or symbols which contrast with primary surface color). Markings may include the manufacturer's name, the name of the medication, the size of the dosage, etc. In some instances, this information is embossed onto the outer surface of the pill during manufacture of the medication. In other instances, it is printed on the capsule after the pill is made. In either instance, recognition of this information will establish the type of pill filling the container.

With respect to finish, some of the pills have a shiny coating, characterized by highlights. These are distinguishable from pills having a matte finish which show a completely diffuse reflection. Even within the categories of glossy or matte, some of the exemplars show noticeably different surface textures. For example, a number of the capsules have all or half of their length translucent so that tiny, spherical inner pellets of medication show through. Some of the other shape categories, including circular cylinders, show visible surface textures, with some having contrasting filamentary particles showing.

An advantage of using texture or finish features for pill recognition is that the pill orientation is relatively immaterial. On the other hand, features such as scores and markings appear different from different pill orientations. The final distinguishing feature is to recognize the alphanumeric markings on the individual pills.

Figure 10A:
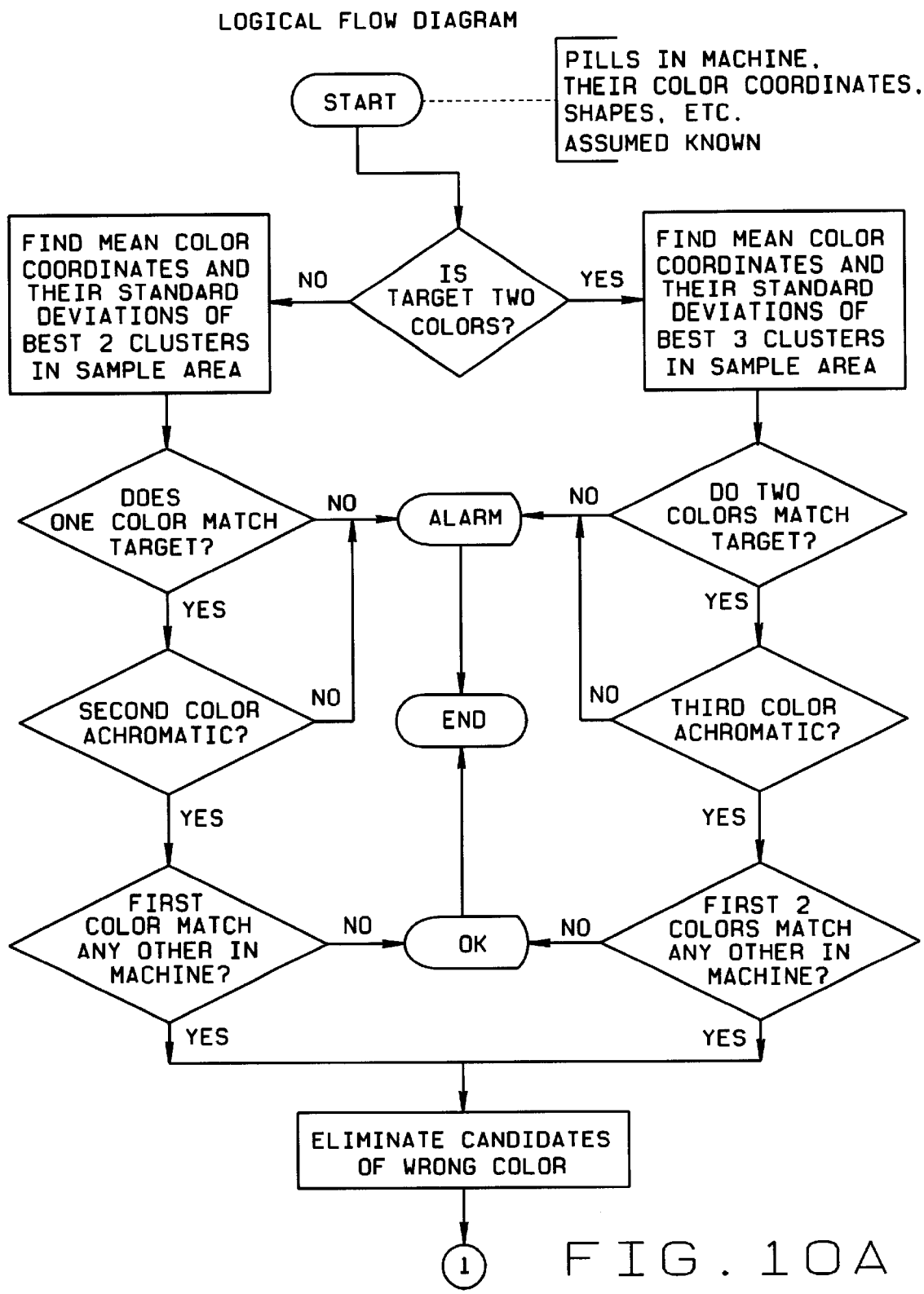
FIGS. 10A–10D are a flow chart for understanding operation of the invention to recognize pills.
Figure 10B:
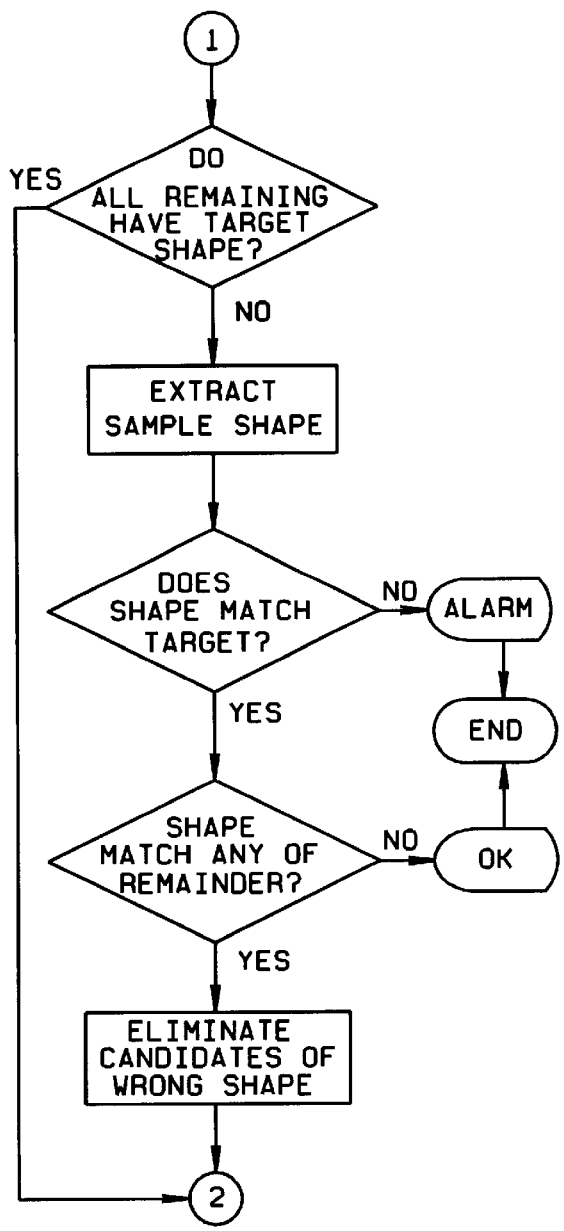
Figure 10C:
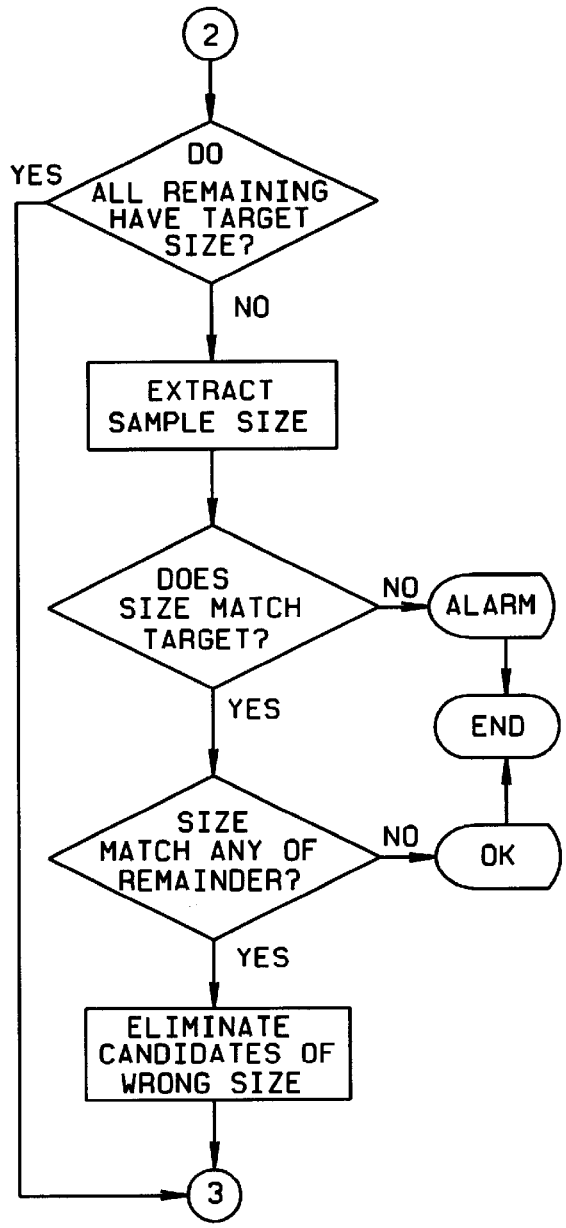
Figure 10D:
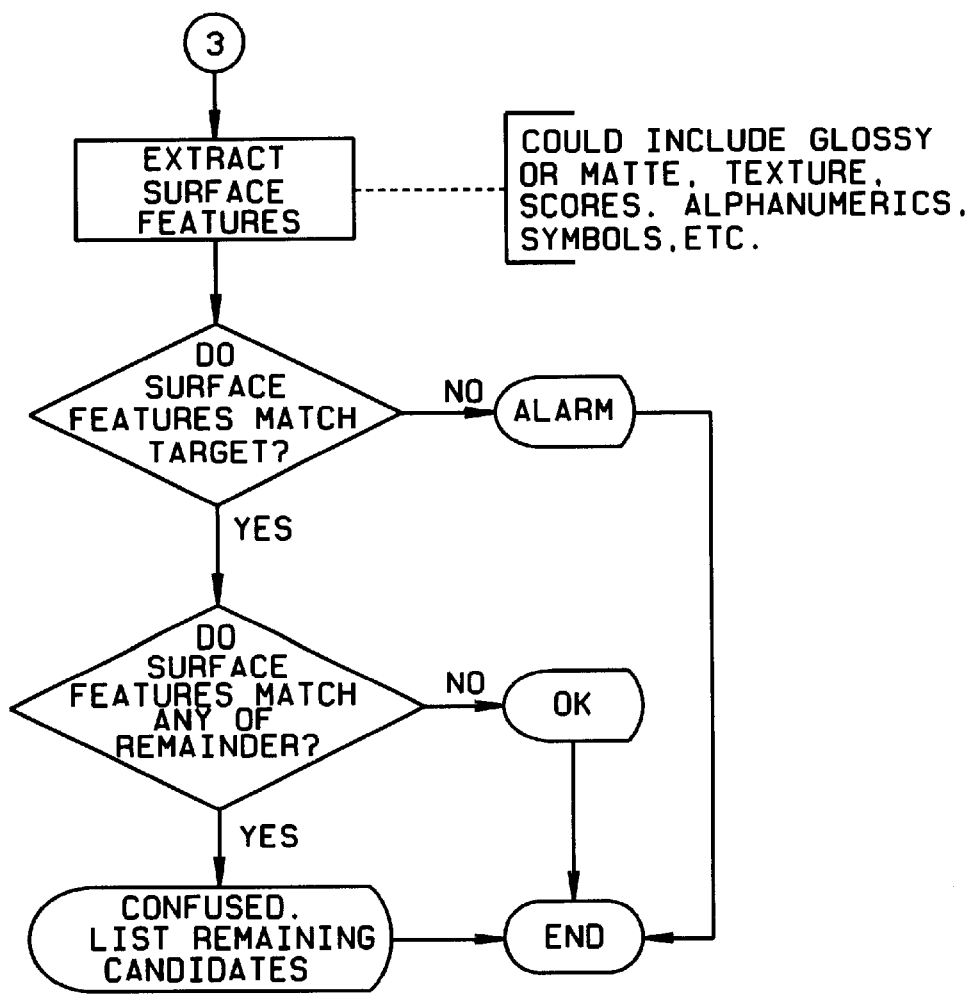

Having derived a set of features, a logical framework is used to perform basic decision making based upon the image processing evidence presented. A simplified flowchart for accomplishing this function is shown in FIGS. 10A–10D. A second color pass is not described herein, but in essence, the method is similar to that shown in FIG. 10A, but with the sampling area reduced to a single pill. This second color pass occurs after the shape algorithm is executed. That is, the second color pass occurs after completion of the steps shown in FIG. 10B, but before those shown in FIG. 10C FIG. 10A represents the logic steps performed in determining if the prescription is correctly filled based upon color discrimination. If there is a color match between the pill contents of a container C match and the representative pill with which the prescription is to be filled, and if the color of the pill is sufficiently unique that no other pill coloring could be confused with it, then the container is accepted and the method terminated. Conversely, if there is no color match between the pill contents and the representative pill, then an "alarm" is given noting that pills in the container do not match the prescription on the label of that container. If the pill colors match, but the color is not sufficiently unique, then the process proceeds to the steps shown in FIG. 10B, which now try to distinguish the medication on the basis of shape. Again, the process looks to establish whether the shape is categorically wrong, which ends in an "alarm"; or sufficiently unique, when combined with prerequisite color, that the pills can be said to be correct and the process ended. Otherwise, the process proceeds to those steps shown in FIG. 10C which now discerns pills based on size. The process rejects a categorical size mismatch, but confirms on a match of pill size, the subject pill having previously been accepted as to color and shape. Should there still exist potential confusion with other pills, the process next executes the logic steps shown in FIG. 10D where additional discrimination is attempted based on surface features including surface finish, texture and markings. Again, any categorical differences in any of these categories results in rejection of the pill container. Acceptance of surface features, if unique, and with all other indicia accepted, results in acceptance of the contents. If, at the end of the process, the system cannot categorically accept or reject the contents, then the system so indicates, and an output is provided listing the other pill (or pills) with which the content of the container could be confused. Now, a pharmacist can separately review the container contents with the listing and determine if the prescription has been accurately filled.

What has been described is an apparatus for filling a pharmaceutical prescription for a medication and a method which automatically verifies whether the medication dispensed into a container is the correct medication. Verification is performed using an image processing technique and the method which includes the extraction of attributes or features of a dispensed medication and the classification of the medication based upon these features. An image of the medication, as dispensed, is obtained and the image is processed to classify attributes of the medication such as pill color, size and shape of a unit of medication, and any indicia imprinted on a pill. A database is provided of all the possible medication that can be dispensed by the apparatus, and the method involves a classification protocol using the database and the extracted features to verify the medication.

After dispensing, the apparatus operates to compare dispensed medication with that requested to fill a prescription, and to forward the dispensed medication if its identity corresponds with that requested. If a medication is not identified as that requested, or if the apparatus is not certain that the medication is that requested, an outside agency such as a pharmacist is used to check the dispensed medication with that prescribed. The apparatus fills prescriptions with a high degree of accuracy, and quickly and efficiently verifies each medication dispensed. The apparatus and optical verification method of the invention substantially reduce the cost of filling a prescription while simultaneously insuring the accuracy of each medication dispensed.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

What is claimed is:

1. A method that incorporates an examination device to identify the type of contents dispensed into a container, the contents being dispensed without any predetermined orientation or position within the container, the method comprising:
   a. the examination device obtaining an image of the contents of the container;
   b. processing the image to isolate a unit of the contents;
   c. processing the image of the isolated unit to extract multiple characteristic features of that unit, said features being selected from the group consisting of: (a) color; (b) patterns of color; (c) three-dimensional shape; (d) three-dimensional size; (e) surface finish; (f) surface texture; (g) surface markings; (h) surface scoring; and (i) surface reflectivity; and
   d. comparing one or more of the isolated features to a set of reference features representative of known content types to identify the type of contents of the container.

2. The method of claim 1 wherein the characteristic features of the contents are automatically extracted during image processing and include the color of the contents.

3. The method of claim 2 wherein comparing the extracted features of the contents to sets of features for each possible contents of the container includes comparing the color of the contents, accepting the container if the content's color is sufficiently unique that no other container contents can be confused with it, and rejecting the container if there is no color match.

4. The method of claim 1 wherein extracting characteristic features of the contents includes identifying the shape of the contents.

5. The method of claim 4 wherein comparing the extracted features of the contents to sets of features for each possible contents of the container includes comparing the contents' shape, accepting the container if there is a match for the contents' shape, and rejecting the container if there is no shape match.

6. The method of claim 1 wherein extracting characteristic features of the contents includes identifying the size of the contents.

7. The method of claim 6 wherein comparing the extracted features of the contents to sets of features for each possible contents of the container includes comparing the contents' size, accepting the container if there is a size match, and rejecting the container if there is no size match.

8. The method of claim 1 wherein extracting characteristic features of the contents includes identifying surface features of the contents.

9. The method of claim 8 wherein comparing the extracted features of the contents to sets of features for each possible contents of the container includes comparing the surface features of the contents, accepting the container if there is a match of the surface features, and rejecting the container if there is no surface feature match.

10. The method of claim 1 further including provisionally rejecting a container if, as a result of the feature set comparison, a determination cannot be made as to whether the contents of the container are the correct contents.

11. The method of claim 10 wherein any provisionally rejected container is visually inspected to determine if the contents are the correct contents.

12. A method of determining whether a type of medication dispensed into a container, such that the dispensed medication lacks any predetermined orientation or position within the container, corresponds to an expected type of medication in accordance with a prescription therefor, the method incorporating an examination device to identify the type of contents, the method comprising:
   a. the examination device obtaining an image of the medication as dispensed into the container;
   b. processing the image to isolate a unit of the medication;
   c. processing the image of the isolated unit to extract multiple characteristic features of that unit, said features being selected from the group consisting of: (a) color; (b) patterns of color; (c) three-dimensional shape; (d) three-dimensional size; (e) surface finish; (f) surface texture; (g) surface markings; (h) surface scoring; and (i) surface reflectivity; and
   d. comparing one or more of the isolated features to a set of reference features representative of what type of medication should be dispensed, said comparison ensuring that the extracted features are not confused with any other set of reference features for other possible types of medication which could be dispensed into the container.

13. The method of claim 12 wherein the characteristic features of the dispensed medication are automatically extracted during image processing and include the color of the medication.

14. The method of claim 13 wherein comparing the extracted features of the medication to sets of features for each possible medication includes comparing the color of the medication, accepting the container if the medication's color is sufficiently unique that no other medication can be confused with it, and rejecting the container if there is no color match.

15. The method of claim 12 wherein extracting characteristic features of the dispensed medication includes identifying the shape of the medication.

16. The method of claim 15 wherein comparing the extracted features of the dispensed medication to sets of features for each possible medication includes comparing the medications' shape, accepting the container if there is a match for the shape, and rejecting the container if there is no shape match.

17. The method of claim 12 wherein extracting characteristic features of the dispensed medication includes identifying the size of the medication.

18. The method of claim 17 wherein comparing the extracted features of the dispensed medication to sets of features for each possible medication includes comparing the size the medications, accepting the container if there is a size match, and rejecting the container if there is no size match.

19. The method of claim 12 wherein extracting characteristic features of the dispensed medication includes identifying surface features of the medication.

20. The method of claim 19 wherein comparing the extracted features of the dispensed medication to sets of features for each possible medication includes comparing the surface features of the medications, accepting the container if there is a match of the surface features, and rejecting the container if there is no surface feature match.

21. The method of claim 12 further including provisionally rejecting a container if, as a result of the feature set comparison, a determination cannot be made as to whether the dispensed medication is the correct medication.

22. The method of claim 21 wherein any provisionally rejected container is visually inspected to determine if the dispensed medication is the correct medication.

23. A method of determining whether a type of medication in pill form dispensed into a container such that the dispensed pills lack any predetermined orientation or position within the container, corresponds to an expected type medication in accordance with a prescription therefor, the method incorporating an examination device to identify the type of contents, the method comprising:
   a. the examination device obtaining an image of the pills as dispensed into the container;
   b. processing the image to isolate a unit of the pills;
   c. processing the image of the isolated unit to extract multiple characteristic features of that unit, said features being selected from the group consisting of: (a) color; (b) patterns of color; (c) three-dimensional shape; (d) three-dimensional size; (e) surface finish; (f) surface texture; (g) surface markings; (h) surface scoring; and (i) surface reflectivity; and
   d. comparing one or more of the isolated characteristic features to a set of reference features representative of what type of medication the dispensed medication should be, said comparison ensuring that the extracted features are not confused with any other set of reference features for other possible types of which could be dispensed into the container.

24. A method of dispensing one of a plurality of possible medications and verifying the identity of the medication comprising:
   dispensing a plurality of medication units from a first container to a second container such that the medication units have no predetermined location or orientation;
   obtaining an image of the plurality of medication units within the second container;
   processing the image to obtain an image of a single medication unit from the plurality of medication units within the second container;
   processing the isolated unit to extract multiple characteristic features of that unit, said features being selected from the group consisting of: color, patterns of color, three-dimensional shape, three-dimensional size, surface finish, surface texture, surface markings, surface scoring, and surface reflectivity; and
   comparing one or more of the isolated features to a set of reference features representative of known content types to identify the type of contents of the container.

25. A method of dispensing one of a plurality of possible medications and verifying the identity of the medication comprising:

dispensing a plurality of medication units from a first container to a second container such that the medication units have no predetermined location or orientation;

obtaining an image of the plurality of medication units within the second container;

processing the image to isolate a single unit from the plurality of medication units within the second container;

processing the isolated unit to extract multiple characteristic features of that unit, said features being selected from the group consisting of: color, patterns of color, three-dimensional shape, three-dimensional size, surface finish, surface texture, surface markings, surface scoring, and surface reflectivity; and comparing one or more of the isolated features to a set of reference features representative of known content types to route the second container to either an area for second containers whose contents are positively confirmed as correct;

an area for second containers whose contents are positively confirmed as incorrect;

an area for second containers whose contents cannot be positively identified as correct or incorrect.

26. A method of dispensing one of a plurality of available medications and verifying the identity of the medication comprising:

dispensing a plurality of medication units from first container containing a requested one of the plurality of available medications into a second container such that the medication units have no predetermined location or orientation;

obtaining an image of the plurality of medication units within the second container;

processing the image to isolate a single unit from the plurality of medication units within the second container;

processing the isolated unit to extract multiple characteristic features of that unit, the features being selected from the group consisting of: color, patterns of color, three-dimensional shape, three-dimensional size, surface finish, surface texture, surface markings, surface scoring and surface reflectivity; and comparing one or more of the features to a set of reference features representative of the available medications;

verifying that the isolated unit matches the reference features of the requested one of the plurality of available medications.

27. The method of claim 26 further comprising the step of verifying that the isolated unit does not match the reference features of the available medications being dispensed.

28. The method of claim 26 further comprising the step of verifying that the isolated unit is sufficiently different from any of the available medications being dispensed.

* * * * *